United States Patent [19]

Cooprider et al.

[11] 3,995,774
[45] Dec. 7, 1976

[54] LIQUID DISPENSER HAVING DEFORMABLE DIAPHRAGM TYPE PUMP

[75] Inventors: Rex C. Cooprider, Hacienda Heights; Richard P. Grogan, Ontario, both of Calif.

[73] Assignee: Diamond International Corporation, New York, N.Y.

[22] Filed: Sept. 12, 1975

[21] Appl. No.: 612,926

[52] U.S. Cl. ............................... 222/207; 222/214; 222/383; 417/479
[51] Int. Cl.² ......................................... B05B 11/01
[58] Field of Search .......... 417/479; 222/206, 207, 222/209, 214, 383, 385

[56] References Cited
UNITED STATES PATENTS

| | | | |
|---|---|---|---|
| 2,980,032 | 4/1961 | Schneider | 417/479 |
| 3,451,597 | 6/1969 | Watson, Jr. | 222/207 |
| 3,452,905 | 7/1969 | Micallef | 222/207 |
| 3,726,442 | 4/1973 | Davidson et al. | 222/207 |
| 3,749,290 | 7/1973 | Micallef | 222/385 |
| 3,840,157 | 10/1974 | Hellenkamp | 222/385 X |

Primary Examiner—Robert B. Reeves
Assistant Examiner—David A. Scherbel
Attorney, Agent, or Firm—Watson, Cole, Grindle & Watson

[57] ABSTRACT

In a liquid dispensing pump of the deformable diaphragm type, the diaphragm includes an encircling marginal flange which is clamped between the pump housing members to function as a sealing gasket, with integral portions of the flange extending across the inlet and discharge passages leading to and from the pump chamber to function as flap type intake and outlet valves having their free edges defined by apertures in the flange through which the liquid may pass when the valves are unseated.

9 Claims, 6 Drawing Figures

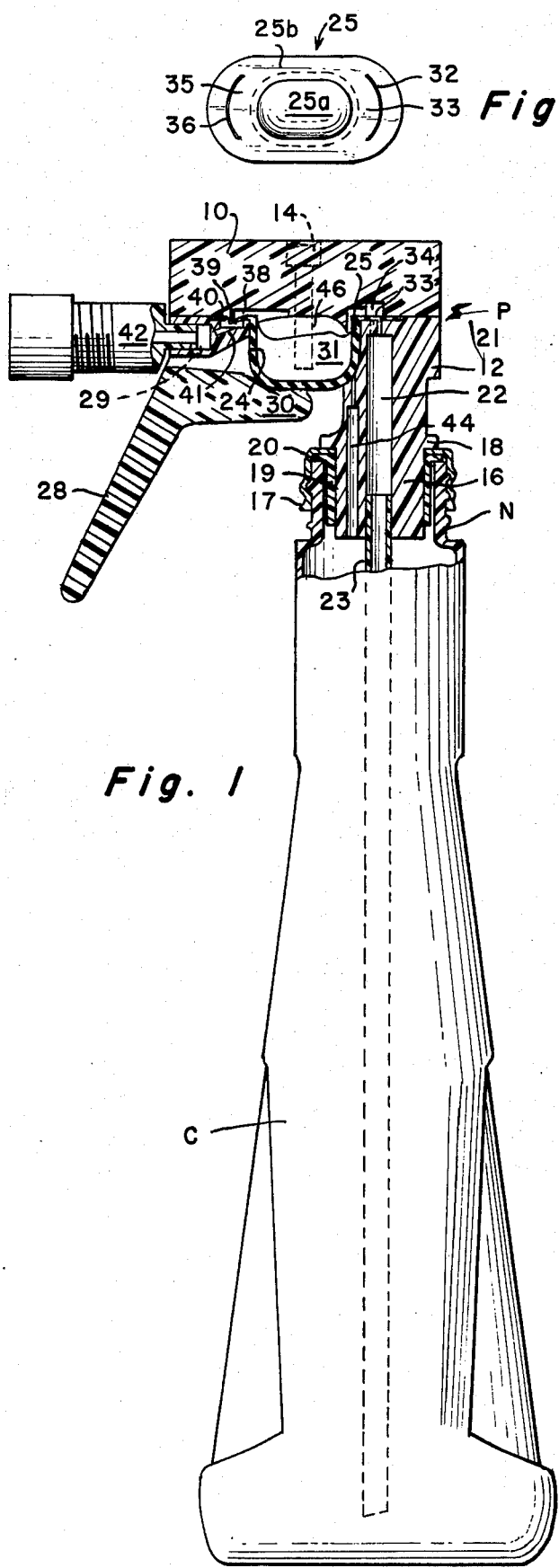
Fig. 1
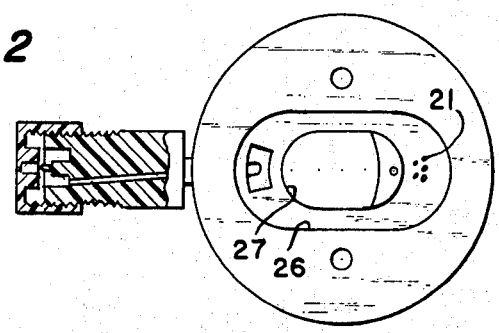
Fig. 2
Fig. 3
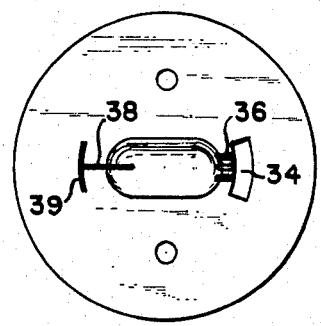
Fig. 6

LIQUID DISPENSER HAVING DEFORMABLE
DIAPHRAGM TYPE PUMP

This invention relates to improvements in a liquid dispensing pump of the deformable diaphragm type exemplified by the disclosure of the pending application Ser. No. 579,572 of Richard P. Grogan et al filed May 21, 1975, and of common ownership herewith.

In the dispensing pump disclosed by the aforesaid co-pending application, the pump is of the type in which a resiliently deformable diaphragm is clamped between opposing housing members and cooperates with one of said members to define a variable volume pump chamber in which inlet and outlet passages provided by the pump housing define a discharge path for liquid from a supply container through the pump chamber to a discharge nozzle. The diaphragm includes as a unitary portion thereof a marginal flange which is clamped in fluid type manner between the housing members to function as a sealing gasket and also as a check valve means for securing a unidirectional flow of fluid through the discharge path.

Since the discharge path extends around the outer edge of the flange it is necessary to provide a separate additional gasket for the sealing means outwardly of the discharge path to avoid leakage from the pump disclosed in said co-pending application.

In accordance with the present invention the requirement for such a separate additional gasket is eliminated. The marginal diaphragm flange is capable of functioning as the sole gasket means required for rendering the pump housing and pump chamber fluid type, and the liquid discharge path extends through, rather than around the flange.

SUMMARY OF THE INVENTION

In accordance with the present invention the marginal flange of the diaphragm is formed to include flap valves constituting unitary portions thereof. These flap valves extend across and normally close the respectively inlet and outlet passages which jointly define the discharge path for the liquid, and there are provided apertures through the flange adjoining and defining free edges of the respective flap valves to permit unidirectional flow only of liquid through the flap valves and their associated apertures when the valves are unseated. The housing members respectively provide seats for the valves on the upstream sides thereof having regard to the direction of the flow from the supply container to the discharge nozzle, and such passages also include recesses on the downstream sides of the valves positioned to permit unseating of such valves responsive to liquid pressures thereagainst in a downstream direction.

BRIEF DESCRIPTION OF THE SEVERAL VIEWS OF THE DRAWINGS

To facilitate a rapid understanding of the invention, reference will now be made to the preferred embodiment thereof illustrated in the accompanied drawings and specific language will be used to describe the same. It will nevertheless be appreciated that no limitation of the scope of the invention is thereby intended and that such further modifications and alterations are contemplated as would normally occur to one skilled in the art to which the invention relates.

In the accompanying drawings:

FIG. 1 is a view partly in elevation and partly in section of the preferred diaphragm type dispensing pump of the invention as applied to a conventional container for the liquid to be dispensed by the pump.

FIG. 2 is a detail plan view of the diaphragm employed in the pump.

FIG. 3 is a plan view of the lower housing member prior to assembly therewith of the diaphragm and the upper housing member.

FIG. 6 is a bottom plan view of the upper housing member of the pump housing.

DETAILED DESCRIPTION

Figure 4:
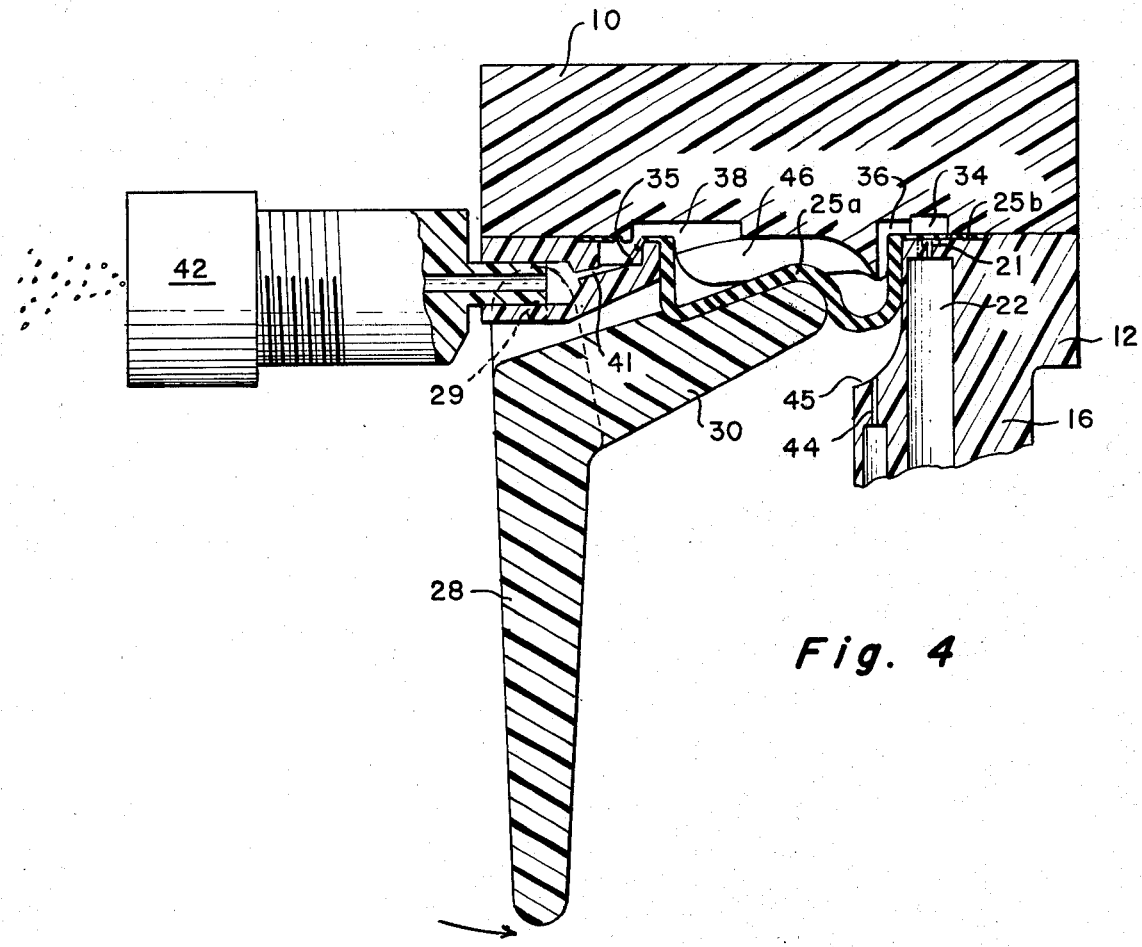
FIG. 4 is a section through the pump, taken in the same vertical plane as in FIG. 1, but with parts thereof broken away, and with the moveable components of the pump in the position which they assume near the completion of the pump compression or discharge stroke or cycle.

Referring now in detail to the drawing, the pump housing generally designated P in its entirety is adapted for mounting on a conventional container, here illustrated in the form of a plastic bottle C adapted to hold a supply of the liquid product to be dispensed. The container has an externally threaded neck N, defining its filling and dispensing opening.

The pump comprises upper and lower housing members 10 and 12 respectively interconnected in fluid tight manner, as by screws 14 disposed through and secured in registering holes in the lower and upper housing members.

In order to support the pump on the container, the depending plug 16 constituting an integral portion of the lower housing member 12, extends into the container neck N through an opening in the conventional threaded container cap 17. The plug is supported against axial movement by surrounding flange 18 encircling the plug in abutment with the top of the container cap, and by means of a sleeve 19 frictionally fitted on or otherwise fixed to the plug beneath the cap, and preferably having a surrounding sealing flange or gasket 20 resting on the upper end of the container neck and clamped between container neck and lower face of the cap in a fluid tight manner, by threading of the cap onto the container neck.

The liquid supply or intake passage for the pump includes the intake port 21 and the intake passage 22, both extending through said plug and the conventional dip tube 23 fitted into the lower end of said intake passage and communicating with the lower end portion of the container.

The lower housing member has an opening 24 therein through which the deformable dome portion 25a of resilient diaphragm 25 projects and is accessible for deformation to actuate the pump. The diaphragm 25 also includes an encircling marginal flange 25b clamped between opposing clamping surfaces 10a and 10b of the interconnected housing members 10 and 12 respectively. In order to facilitate proper orientation of the diaphragm as well as to limit its deformation under clamping action, diaphragm flange 25b is partially countersunk into a conformingly shaped depression 26 in the upper face of the lower housing member 10, as shown in FIG. 3. The flat bottom of this depression 26 serves as a flat clamping surface in co-operation with the registering portion of the downwardly directed surface 10a of the upper housing member 10 so that the diaphragm flange 25b is clamped in sealing relation between them completely around the dome or bulb 25a of the diaphragm. The depending convex side of the dome 25a depends through the central opening 24 in the lower housing member and is accessible through said opening for deformation as by means of a lever 28, fulcrumed at 29 on the lower housing member with its free end portion 30 in operative engagement with the depending dome or domed portion of the diaphragm in such manner that by pulling the depending trigger portion of the lever in a counterclockwise direction as seen in FIGS. 1 and 4, the diaphragm will be deformed to reduce the volume of the pump chamber 31 which is jointly defined by the diaphragm and the upper housing member 10.

By virtue of the resiliency of the diaphragm 25, when the trigger is released after being thus actuated to deform the diaphragm on the compression stroke of the pump, the resiliency of the diaphragm causes it to resume its normal unstressed condition as shown in FIG. 1, while at the same time returning the trigger 28 to its normal inoperative position and thus dispensing with the need for a trigger return spring.

In the instant embodiment, the diaphragm 25 and its surrounding flange 25b are of generally oval shape, with the opposite end portions of the flange 25b preferably of somewhat greater width than the remaining portions thereof, to better achieve the valving functions hereinafter described in more detail.

It will be noted that the inlet passage 23, 22, 21 terminates in the upwardly directed inlet port 21 directly beneath one widened end of the flange 25b with the flange normally extending across and closing the port. Formed through the flange, is an aperture 32, located to one side of the inlet port and preferably of slit like configuration to define a locally deformable portion 33 of the flange normally seating over and closing the inlet port 21 but capable of being unseated by fluid pressure therebeneath to function as an inlet valve admitting outward flow of liquid from the passage 22 through the slit or aperture 32, thence to a recess 34 in the lower surface of upper pump housing 10. This recess communicates through one or more grooves or passages 37 with pump chamber 31. The recess 34 is located above and in substantial registry with the pump inlet valve 33 to permit local upward flexing and unseating thereof on each suction or expansive stroke of the diaphragm 25.

The outlet passage from the pump chamber 31 is controlled in generally similar manner by a flap type outlet valve 35, which is defined by a suitably located aperture or arcuate slit 36 in the opposite end portion of the diaphragm flange 25b.

It will be seen that at the location of this flap valve 35, the upper housing member 10 defines an outlet port 38, here shown in the form of a groove in the lower face of the upper housing member communicating with the pump chamber and extending outwardly, with its outer end normally closed by seating of the outlet valve 35 thereover and against the lower surface of the upper housing member 10.

As shown in FIG. 2, the outlet valve 35 of the preferred embodiment is formed in a manner similar to the inlet flap valve 33, by means of an arcuate aperture or slit 36 through the flange 25b of the diaphragm. In order to improve the seating of the outlet valve 35 by its own resiliency, the lower face of the upper housing member 10 is desirably provided with a slightly projecting arcuate rib 39 (FIG. 6) for sealing engagement with the similarly arcuate edge of the valve 35. Preferably, the opposite ends of this rib merge smoothly with the downwardly presented flat surface of the upper housing member, to prevent the formation of a gap or space which might interfere with proper seating of the valve 35.

Beneath the outlet valve 35, the lower housing member 12 is provided with a recess 40 into which the valve 35 may open under pressure of fluid within the pump chamber 31 on each compression or discharge stroke of the pump. Such opening or unseating of the outlet valve 35 establishes communication through the aperture 36 between the discharge port 38 and recess 40, which in turn communicates through the passage section 41 with a conventional discharge nozzle 42, through which the liquid from the pump chamber is discharged into the atmosphere. The outlet port 38, recess 40, passage section 41 and discharge nozzle 42, thus jointly define an outlet passage from the pump chamber 31 to the atmosphere.

As in our earlier identified co-pending application, Ser. No. 579,572 a vent passage 44 extends through the plug 16 from the exterior of the container C, and opens upwardly through a valve seat 45 which is shaped and located for conforming sealing engagement with the convex lower surface of the diaphragm dome 25a when the latter is in its normal fully expanded shape. Thus the dome 25a, when undeformed, functions as a valve to seat over and close the vent passage, to prevent leakage of the container contents during shipping and storage. However, each time the trigger lever 28 is actuated to deform the diaphragm dome 25a, on a compression or discharge stroke, the dome 25a automatically unseats from over the vent passage to permit equalization of air pressures within and outside of the container. Moreover, the dome 25a will automatically be unseated by super-atmospheric pressure within the container, arising from changes in temperature or altitude.

Further to facilitate orientation of the parts during their assembly, the upper housing member 10 includes a depending boss 46 shaped in plan similarly to this interior plan shape of the oval diaphragm dome, for nesting reception therein. As best shown in FIG. 4, the lower face of the boss 46 is preferably shaped to substantially mate with the inner face of the dome, in the deformed shape which the latter assumer in its fully deformed condition, at the end of each pump compression stroke or cycle, and substantially parallel to or equidistant from the adjacent surface of the lever free end 30, to thus distribute the lever pressure over a wide area and thereby to avoid cutting or abrading the dome.

The operation of this pump, which is believed to be apparent from the foregoing description, is summarized as follows:

Assuming that the pump parts are at rest in the positions illustrated in FIG. 1. At this time both valves 33 and 35 as well as the vent passage 44 are closed and the dome 25a and pump chamber 31 are fully expanded, and filled with liquid product from previous use. The container may be grasped in the user's hand, with one or more fingers thereof encircling the trigger lever 28. By squeezing the lever to swing it in a counterclockwise direction toward the container C, the free end of the lever will be swung upwardly to substantially the position of FIG. 4, to compress the dome or bulb 25 on the compression cycle or stroke of the pump. The resulting pressure on liquid in the pump chamber, maintains the inlet valve 33 seated, to prevent backflow of liquid from the pump chamber toward the container, while at the same time opens the outlet valve and discharges pressurized liquid through the outlet passage defined by the outlet port 38, recess 40, passage section 41, and nozzle 42 into the atmosphere. The vent passage 44 will be opened shortly after inception of the compression cycle by deformation of the dome 25.

As the trigger lever 28 is released, the expansion of the dome 25 by its own resiliency, produces the expansion or suction stroke of the pump and also restores the trigger to its retracted position of FIG. 1.

Figure 5:
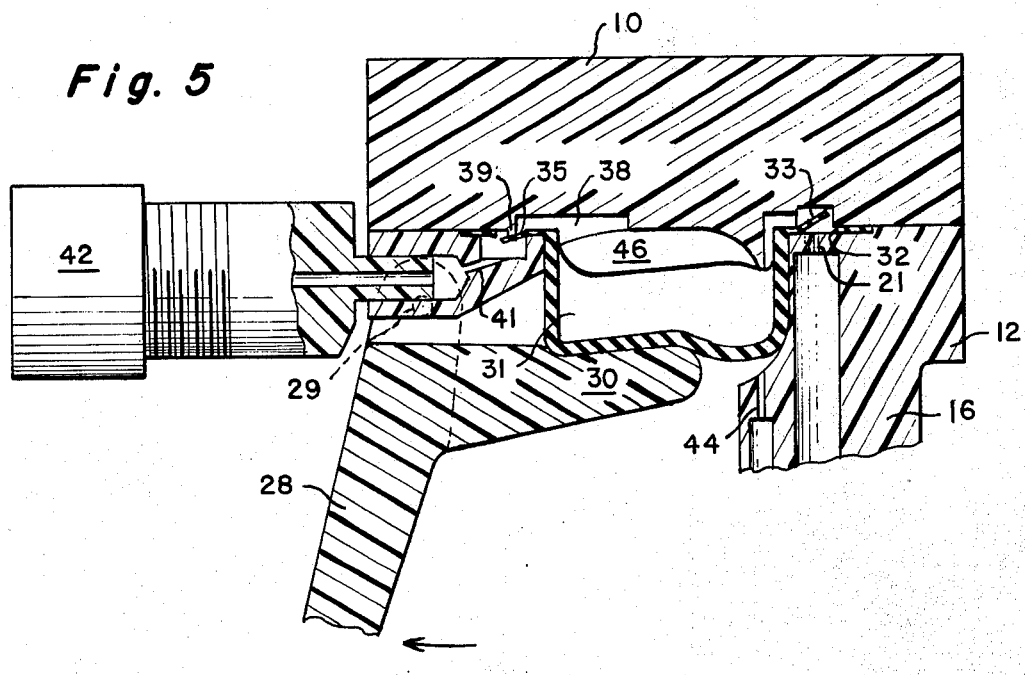
FIG. 5 is a view similar to FIG. 4, with the moveable pump components in an intermediate position substantially midway of the pump expansion or suction stroke or cycle.

Such expansion of the dome, with resulting reduction of its internal pressure, urges the outlet valve 35 upwardly to seated or closed relation against the upper housing member 10, while unseating the inlet valve 33 and drawing liquid from the container C upwardly through the intake passage portions or sections 23, 22, 21, 34 and 35 into the pump chamber 31. The deformation of the dome 25 will normally maintain the vent passage 44 open until the expansion cycle nears completion, and the return movement of the parts has progressed somewhat beyond the positions shown in FIG. 5, thus permitting atmospheric air to be drawn freely into the container C as necessary to replace liquid which was discharged on the preceding compression stroke of the pump.

By virtue of the novel structure herein disclosed, the unitary diaphragm 25, in addition to defining the variable volume pump chamber, includes unitary portions which function as intake and discharge valves, as well as providing portions of the liquid discharge path from the container to the atmosphere, and providing all the necessary gasket or sealing functions between the pump housing members. In addition, in the preferred embodiment, the diaphragm 25 is so associated with the respective pump housing members as to facilitate their assembly in properly oriented relation to both the diaphragm and to each other.

Having thus described our invention, We claim:

1. In a dispensing pump of the class in which a resiliently deformable diaphragm clamped between opposing pump housing members of the pump housing cooperates with one of said members to define a variable volume pump chamber in which inlet and outlet passages formed in said pump housing define a discharge path for liquid from a supply container through said pump chamber to a discharge nozzle, said diaphragm including an endless resiliently deformable marginal flange clamped in fluid tight manner betwen said housing members and encircling said pump chamber;

the improvement in accordance with which said flange includes flap valves constituting unitary portions thereof, said flap valves extending across and normally closing the respective inlet and outlet passages, there being apertures through said flange adjoining and defining free edges of the respective flap valves to permit flow of liquid through said passages when the valves are unseated;

said housing members respectively providing sets for the respective valves on the upstream sides of said valves with reference to the flow of liquid from said supply container toward said discharge nozzle;

the said passages respectively including recesses on the downstream sides of said valves positioned to permit unseating of said valves responsive to liquid pressures thereagainst in a downstream direction;

and an operating lever fulcrumed to one of said housing members and having a portion movable through an opening in one said members into operative deforming engagement with said diaphragm to vary the volume of said pump chamber.

2. A dispensing pump as defined in claim 1, in which said operating lever is medially fulcrumed to said one housing member, one free end of said lever being swingable through said opening into operative engagement with said diaphragm, and the other end of said lever constituting a manually operable trigger for actuating said pump.

3. A dispensing pump as defined in claim 1, in which portions of said inlet passage and portions of said outlet passage are defined by each of said housing members, said inlet passage portions and said outlet passage portions respectively communicating with each other through said respective apertures in the flange, when said inlet and outlet valves respectively are unseated.

4. A dispensing pump as defined in claim 1, in which each said aperture through the flange is in the form of a slit partially encircling one of said valves to define same as a flap attached to the diaphragm along one edge and having a free end portion extending across one of said passages.

5. In a dispensing pump of the class in which a resiliently deformable diaphragm clamped between opposing pump housing members of the pump housing cooperates with one of said members to define a variable volume pump chamber in which inlet and outlet passages formed in said pump housing define a discharge path for liquid from a supply container through said pump chamber to a discharge nozzle, said diaphragm including an endless resiliently deformable marginal flange clamped in fluid tight manner between said housing members and encircling said pump chamber;

the improvement in accordance with which said flange includes flap valves constituting unitary portions thereof, said flap valves extending across and normally closing the respective inlet and outlet passages, there being apertures through said flange adjoining and defining free edges of the respective flap valves to permit flow of liquid through said passages when the valves are unseated;

said housing members respectively providing seats for the respective valves on the upstream sides of said valves with reference to the flow of liquid from said supply container toward said discharge nozzle;

the said passages respectively including recesses on the downstream sides of said valves positioned to permit unseating of said valves responsive to liquid pressures thereagainst in a downstream direction;

said diaphragm including a central deformable dome surrounded by and integral with said flange, said dome and said flange being of generally oval configuration in plan, said dome being received in a conformingly shaped opening in one said housing member and the concave side of said opening receiving a conformingly shaped boss of the other housing member, whereby to facilitate proper orientation of said diaphragm and said housing members during their assembly.

6. A dispensing pump of the resiliently deformable diaphragm type comprising:

upper and lower housing members having relatively opposed clamping surfaces of endless configuration;

means interconnecting said housing members with the clamping surfaces in opposing relation to form a pump housing;

a resiliently deformable diaphragm having an encircling marginal flange therearound clamped between said clamping surfaces;

said diaphragm and said upper housing member jointly defining an enclosed variable volume pump chamber;

said lower housing member having an opening therethrough beneath said diaphragm to permit access to said diaphragm for deforming same to vary the volume of said pump chamber;

said lower housing member defining a fluid inlet passage opening upwardly through an inlet port in its clamping surface beneath said flange;

said flange defining a flap type inlet valve above said inlet port and being provided with an aperture therethrough at one side of said port, said upper housing member having a recess in its clamping surface above said inlet valve to permit unseating of said inlet valve, said recess communicating with said pump chamber;

said upper housing member defining an outlet port communicating with said pump chamber and opening downwardly above said flange at a location displaced from said inlet port, said flange comprising a flap type outlet valve beneath and in registry with said outlet port and being provided with an aperture therethrough beneath and at one side of said outlet port, said outlet valve normally seating against said clamping surface of the upper housing member and over said outlet port;

said lower housing member being formed with a recess in its clamping surface communicating with a discharge passage to the atmosphere to permit unseating of said outlet valve in response to pressure within said pump chamber.

7. A dispensing pump as defined in claim 6, including a lever fulcrumed on said pump housing at one side of said opening, and having a lever arm disposed for operative movement upwardly through said opening into deforming engagement with said diaphragm.

8. A dispensing pump as defined in claim 7, including a supporting plug depending from said housing for fluid tight reception in the outlet of a container of liquid to be dispensed, said plug having a vent passage upwardly through the lower end of said plug and terminating in said opening, said housing defining a valve seat within said opening around said vent passage, said seat being located and positioned for sealing engagement by said diaphragm in the normally undeformed condition of the diaphragm.

9. A dispensing pump as defined in claim 6, in which each said aperture through the flange is in the form of a slit partially encircling one of said valves to define same as a flap attached to the diaphragm along one edge and having a free end portion extending across one side of said passages.

* * * * *